May 9, 1961 C. B. SPASE 2,983,124
THERMALLY RESPONSIVE TRANSMISSION FOR AUTOMOBILE FAN
Filed June 11, 1959 2 Sheets-Sheet 1
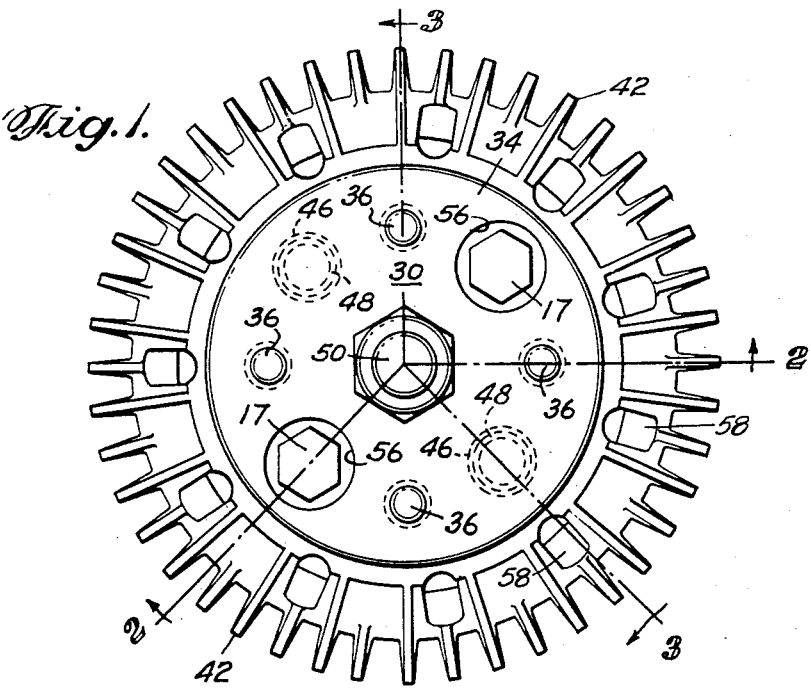
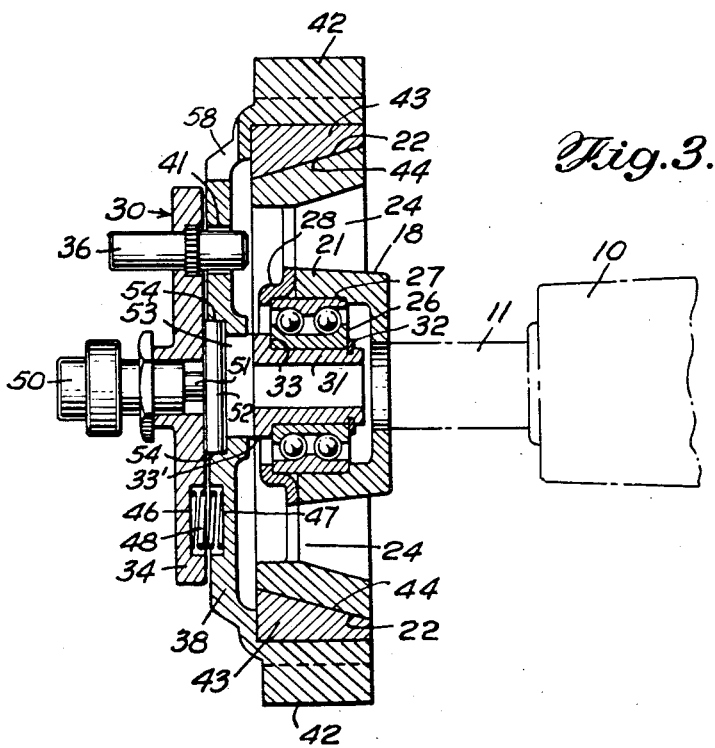

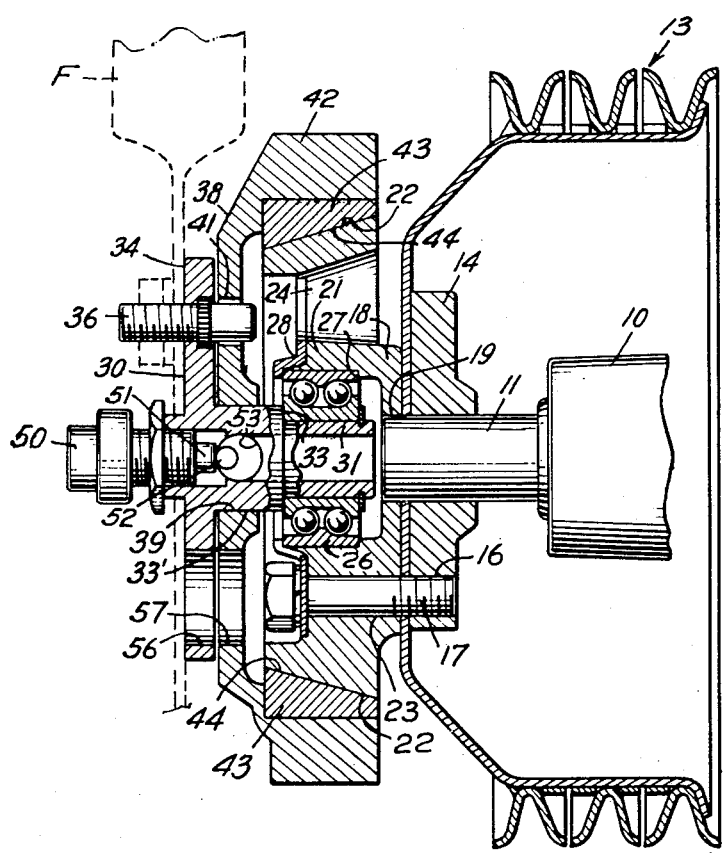

United States Patent Office 2,983,124
Patented May 9, 1961

2,983,124

THERMALLY RESPONSIVE TRANSMISSION FOR AUTOMOBILE FAN

Charles B. Spase, deceased, late of 242 Academy Place, Syracuse, N.Y., by Maude N. Spase, executrix, Syracuse, N.Y.

Filed June 11, 1959, Ser. No. 823,800

10 Claims. (Cl. 64—30)

(Filed under Rule 47(b) and 35 U. S. C. 118)

The present invention relates to a thermally responsive transmission particularly adapted for use with an internal combustion engine having a water jacket and cooling radiator, and more particularly to such a transmission for driving a fan in which the fan is supported by the pump shaft so that aerodynamic forces generated by and in the fan are not transmitted to the transmission. Also, the present invention will be seen to relate to a thermally responsive transmission for a fan in which the thermally responsive element is located so as to be unaffected by the heat generated by the transmission.

Many internal combustion engines are used under such conditions that they do not readily dissipate the heat that is generated by them and as a consequence in order to avoid overheating of these engines they are furnished with jackets surrounding them in which a fluid is caused to circulate, this fluid absorbing heat from the engine and giving up its heat in a radiator. The radiator is simply a heat exchanger through which the cooling water and air are caused to flow in heat exchange relationship. In order to augment the flow of air, and thus the cooling of the water, a fan is used. Usually, the internal combustion engine is equipped with a water pump to circulate the water between the jacket on the engine and the radiator, and this water pump has a shaft that extends outwardly of the engine block and it is on this shaft that the fan is usually placed.

It has long been recognized that the direct driving of the fan is not desirable because, for example, it consumes horsepower from the engine during periods of use when augmented air flow for cooling purposes is either not desired or useless, and also because the consumption of horsepower by the fan is constant despite the fact that the cooling water needs varying amounts of heat removed therefrom under varying conditions of use of the engine.

In order to overcome the deficiencies of the direct fan drive, there has been proposed in the prior art several devices which sense the temperature of the cooling water, either directly or indirectly, and control the amount of torque transmitted to the fan in relation to the temperature of the cooling water. Such devices have not been completely satisfactory in their operation, however, due to the fact that the transmission included a clutch-like element and the thermally sensitive unit used to sense the temperature of the water received heat generated by the slipping clutch surfaces and thus reflected an erroneous indication of the temperature of the cooling water due to the added amount of heat received from the clutch.

Also, these prior units were so constructed that forces created in and by the fan were transmitted through the interengaging clutch faces so as to interfere with their proper functioning. In particular, it is known that the forces transmitted through the clutch interengaging faces that started out as fan aerodynamic forces cause variations in the torque transmitted, and hence of the fan speed and also that there is caused thereby an undue amount of noise.

An object of the present invention is to provide a transmission unit for an internal combustion engine fan in which forces arising from the fan are not transmitted through the interengaging clutch faces.

Another object of the present invention is the provision of a transmission for a fan in which the operation of a clutch-like transmission is not affected by fan generated forces.

A further object of the present invention is to provide a transmission for a fan that is so constructed that the fan is supported by relatively direct connection with the pump shaft.

Yet another object of the present invention is the provision of a smoother, more reliable operation of a transmission unit for a fan.

Another object of the present invention is to provide a thermally responsive transmission for a fan in which the thermally responsive unit thereof is unaffected by heat of the transmission.

Yet another object of the present invention is the provision of a thermally responsive transmission for a fan in which the thermally responsive unit is mounted remotely from the transmission heat generating parts.

Another object of the present invention is to provide a thermally responsive transmission for a fan which is readily removable by ordinary tools.

Other objects and the nature and advantages of the instant invention will be apparent from the following description taken in conjunction with the accompanying drawings, wherein:

Fig. 1 is a front elevation of a thermally responsive transmission in accordance with the present invention.

Fig. 2 is a cross-sectional view taken on the line 2—2 of Fig. 1, together with a showing of related parts to which the transmission is conventionally attached.

Fig. 3 is a cross-sectional view taken on the line 3—3 of Fig. 1.

Referring now to the drawings, wherein like reference characters are used to designate like or corresponding parts throughout the several views, there is shown in Fig. 2 a part 10 of an internal combustion engine, the part 10 having a pump shaft 11 extending therefrom towards a radiator (not shown) which is located forwardly or to the left thereof. Fixed on the pump shaft 11 by any convenient means is a pulley 12 having grooves 13 to receive V-belts, not shown. It will be understood that the V-belts serve to transmit torque from a driving pulley to the pulley 12. Pulley 12 also has a central strengthening plate 14 that is irrotationally fixed to shaft 11 and has bolt holes 16 therein.

Secured to the plate 14 by bolts 17 is a driving member 18 having a central aperture 19 that engagingly receives the pump shaft 11. Driving member 18 has a hub 21 forwardly of the aperture 19 and a forwardly inclined conical driving surface 22 in spaced concentric relation to the hub 21. Between hub 21 and surface 22, driving member 18 has a plurality of peripherally spaced bolt holes 23 in which are received the bolts 17 and a plurality of peripherally spaced air passages 24, it being understood that the air passages 24 are interspersed between the bolt holes 23.

Supported in the hub 21 is an antifriction bearing 26 that is retained against a shoulder 27 in hub 21 by a retaining ring 28 that is in turn held by the bolts 17.

Bearing 26 rotatably supports the hollow shaft 31 of a carrier member generally designated 30. The rear end of hollowed shaft 31 has a groove in which is positioned a snap ring 32 that abuts against the rear face of bearing 26 to prevent forward movement of shaft 31 with respect to bearing 26. An enlarged diameter of shaft 31 presents a shoulder 33 that abuts against the forward face of bearing 26, so that it may be seen bearing 26 and carrier member 30 are fixed against relative longitudinal movement. Forwardly of bearing 26 on hollow shaft 31 is a bearing surface 33' and forwardly of bearing surface 33' is a disc 34. Disc 34 has fixed therein a plurality of peripherally spaced studs 36 each of which extends forwardly and rearwardly of the disc 34 as shown.

A driven member 38 having a central aperture 39 is movably supported on the supporting surface 33' of carrier member 30. Driven member 38 has a plurality of apertures 41 that are slightly larger than the rearwardly extending parts of the studs 36 and hence loosely receives these parts of the studs 36. A rearwardly extending flange 42 of driven member 38 has friction material 43 mounted therein, friction material 43 having a conical surface 44 that is in juxtaposition with the conical driving surface 22 of the driving member 18. As will be understood, it is through engagement of the driving surfaces 22 and 44 that torque is transmitted through and by the apparatus illustrated.

Referring now to Fig. 3, there may be seen in the rear face of disc 34 a well 46, and in the forward surface of the driven member 38 there may be seen a well 47. These wells are in opposed relation and a compression spring 48 is seated in the wells 46 and 47 and urges the driven member 38 rearwardly to thereby maintain the conical surface 22 and the conical surface 44 in contact and under pressure.

A thermally responsive element 50 is supported in and carried by the forward part of the disc 34 and has a rearwardly extending post 51 that is rearwardly extensible upon an increase in temperature of element 50. Post 51 extends into the hollow of the shaft 31 of carrier member 30 and engages a transversely extending pin 52 that is in a relatively enlarged opening 53 in shaft 31. Opening 53 extends transversely through shaft 31 between diametrically opposed points of the supporting surface 33'. The pin 52 has a length that is greater than the diameter of shaft 31 at supporting surface 33 and the ends thereof are received in recesses 54 in driven member 38.

The disc 34 and driven member 38 have aligned peripherally spaced passages 56 and 57 therein, respectively, as may be seen in Fig. 2 and the passages 56 and 57 are at the same radial distance as the bolts 17 to thus permit access to the bolts 17. Also, the aligned passages 56 and 57 permit air flow through the front of the unit as do the peripheral vents 58 of driven member 38.

The forwardly extending parts of the studs 36 are adapted to receive a fan F shown in dotted lines in Fig. 2.

In operation, with the parts assembled as is illustrated in Fig. 2, the pulley 12 will be driven by V-belts and will thus in turn drive the pump shaft 11 and the driving member 18 through the intermediary of the bolts 17. Carrier member 30 is supported in the bearing 26 for rotation, and as will be understood there can be no relative longitudinal movement between the hub 21, the bearing 26 and the carrier 30. Because of the urging of the springs 48 in the wells 46 and 47, the surface 44 of friction material 43 is urged into contact with the conical surface 22 of driving member 18. Thus, torque will be transmitted through the surfaces 22 and 44 and thus from driving member 18 to driven member 38. Because the rearwardly extending parts of the studs 36 extend through the apertures 41 in driven member 18, the drive will be transmitted by the studs 36 into the disc 34 of carrier member 30. It will be recalled that it is onto the disc 34 that the fan F is held, secured by nuts on the threaded forwardly extending ends of studs 36.

It will be understood that when the air moving past the thermally responsive element is cool, and thus the post 51 is retracted, the transmission unit in the above-described condition will not transmit the full amount of torque available to the fan, but instead there will be some slippage between the driving member 18 and driven member 38. Hence, it will be understood that there will be relative rotary motion between the driving member 18 on the one hand and carrier member 30 and driven member 38 and fan F on the other hand.

When the air moving past thermally responsive element 50 becomes heated, and thus there is a requirement for greater cooling and more work to be performed by the fan F, the thermally responsive element 50 will become heated and post 51 thereof will extend and thereby there will be an increase in the force exerted by post 51 on pin 52. This force will be transmitted by the ends of pin 52 to the parts of driven member 38 that define the recesses 54 to thus cause even greater pressure at the interengaging faces 22 and 44. Consequently, there will be transmitted to the fan F more torque to cause it to perform or work.

It will be understood that when fan F is rotated there are generated by it and on it various variable aerodynamic forces, and these forces are transmitted from the blades into the central disc of the fan that is attached to the disc 34 of carrier member 30 by the studs 36. These forces are transmitted back through the shaft 31 of carrier member 30, the bearing 26, the hub 21 and thence into the pump shaft 11, thus avoiding transmission of these forces through the surfaces 22 and 44 and hence through the clutch-like portion of the transmission unit. This results in application of steadily applied forces only to the clutch-like surfaces 22 and 44 and thus the transmission unit operates in a smooth manner. Also, due to the absorption of the fan forces by the structure above set forth, there is a reduction in noise from the fan.

Also, it will be understood that the thermally responsive element 50 is supported by the carrier member 30 so that it is located remotely from the friction material 43 and the heat path from the friction material 43 to the thermally responsive element 50 is through the driven member 38 which has the vents 58 as well as the apertures 57 therein to permit the passage of cooling air. Accordingly, the heat generated in friction material 43 has no substantial effect on the thermally responsive element 50. Additionally passages 24 through the driving member 18 will aid to dissipate heat on the driving surface 22 and around the hub 21 and bearing 26 carried in the hub.

There has been provided a thermally responsive transmission for a fan which supports the fan substantially directly on the pump shaft thus effecting quieter fan operation and steadier and more reliable transmission unit operation. Also, the thermally responsive unit of the device is so located, by virtue of the structure provided, that it receives no substantial amount of heat from the clutch-like transmission unit.

It will be obvious to those skilled in the art that various changes may be made without departing from the spirit of the invention and therefore the invention is not limited to what is shown in the drawings and described in the specification but only as indicated in the appended claims.

What is claimed is:

1. In combination, a driving member having a central aperture adapted to engagingly receive the pump shaft of an engine therein, said driving member having a hub forwardly of said central aperture and a forwardly inclined conical driving surface in spaced concentric relation to said hub, said member between said hub and said surface having peripherally spaced bolt holes and air passages, an antifriction bearing supported in said hub and a carrier member supported by said bearing, said carrier member having a hollow shaft extending into and supported by said bearing, a bearing surface forwardly of said bearing and a disc forwardly of said bearing surface, a plurality of peripherally spaced studs secured to said disc and extending forwardly and rearwardly thereof, a driven member having a central aperture and movably supported on said carrier member bearing surface, said driven member having a plurality of apertures each loosely receiving the rearwardly extending part of one of said studs and having a rearwardly extending flange with friction material mounted therein, said friction material having a conical surface in juxtaposition and engageable with said conical driving surface, opposed wells in the rear face of said disc and the forward surface of said driven member and having compression spring means seated therein and urging said driven member rearwardly, a thermally responsive element carried by the forward part of said disc and having a rearwardly extensible post extending into the hollow shaft of the carrier member, an enlarged opening extending transversely through said hollow shaft and a transversely extending relatively smaller pin in said opening engageable by the post of said thermally responsive element, said pin extending through the bearing surface of said shaft and into recesses in said driven member, the forwardly extending parts of said studs being adapted to have the blades of a fan secured thereon, and peripherally spaced air passages in said driven member.

2. In combination, a driving member having a central aperture adapted to engagingly receive the pump shaft of an engine therein, said driving member having a hub forwardly of said central aperture and a forwardly inclined conical driving surface in spaced concentric relation to said hub, an antifriction bearing supported in said hub and a carrier member supported by said bearing, said carrier member having a hollow shaft extending into and supported by said bearing, a bearing surface forwardly of said bearing and a disc forwardly of said bearing surface, a plurality of peripherally spaced studs secured to said disc and extending forwardly and rearwardly thereof, a driven member having a central aperture and movably supported on said carrier member bearing surface, said driven member having a plurality of apertures each loosely receiving the rearwardly extending part of one of said studs and having a rearwardly extending flange with frictional material mounted therein, said friction material having a conical surface in juxtaposition and engageable with said conical driving surface, opposed wells in the rear face of said disc and the forward surface of said driven member and having compression spring means seated therein and urging said driven member rearwardly, a thermally responsive element carried by the forward part of said disc and having a rearwardly extensible post extending into the hollow shaft of the carrier member, an enlarged opening extending transversely through said hollow shaft and a transversely extending relatively smaller pin in said opening engageable by the post of said thermally responsive element, said pin extending through the bearing surface of said shaft and into recesses in said driven member, the forwardly extending parts of said studs being adapted to have the blades of a fan secured thereon.

3. In combination, a driving member having a central aperture adapted to engagingly receive the pump shaft of an engine therein, said driving member having a hub forwardly of said central aperture and a forwardly inclined conical driving surface in spaced concentric relation to said hub, an antifriction bearing supported in said hub and a carrier member supported by said bearing, said carrier member having a hollow shaft extending into and supported by said bearing, a bearing surface forwardly of said bearing and a disc forwardly of said bearing surface, a plurality of peripherally spaced studs secured to said disc and extending forwardly and rearwardly thereof, a driven member having a central aperture and movably supported on said carrier member bearing surface, said driven member having a plurality of apertures each loosely receiving the rearwardly extending part of one of said studs and having a rearwardly extending flange with friction material mounted therein, said friction material having a conical surface in juxtaposition and engageable with said conical driving surface, spring means between the rear face of said disc and the forward surface of said driven member and urging said driven member rearwardly, a thermally responsive element carried by the forward part of said disc and having a rearwardly extensible post extending into the hollow shaft of the carrier member, an enlarged opening extending transversely through said hollow shaft and a transversely extending relatively smaller pin in said opening engageable by the post of said thermally responsive element, said pin extending through the bearing surface of said shaft and into recesses in said driven member, forwardly extending parts of said studs being adapted to have the blades of a fan secured thereon.

4. In combination, a driving member having a central aperture adapted to engagingly receive the pump shaft of an engine therein, said driving member having a hub and a forwardly inclined conical driving surface in spaced concentric relation to said hub, an antifriction bearing supported in said hub and a carrier member supported by said bearing, said carrier member having a hollow shaft extending into and supported by said bearing, a bearing surface forwardly of said bearing and a disc forwardly of said bearing surface, a driven member having a central aperture and movably supported on said carrier member bearing surface, said driven member having a rearwardly extending flange with friction material mounted therein, said friction material having a conical surface in juxtaposition and engageable with said conical driving surface, spring means between the rear face of said disc and the forward surface of said driven member and urging said driven member rearwardly, a thermally responsive element carried by the forward part of said disc and having a rearwardly extensible post extending into the hollow shaft of the carrier member, an enlarged opening extending transversely through said hollow shaft and a transversely extending relatively smaller pin in said opening engageable by the post of said thermally responsive element, said pin extending through the bearing surface of said shaft and into recesses in said driven member, means operatively connecting said driven member to said carrier member for joint rotary movement and relative axial movement, and means for connecting a fan to said carrier member.

5. In combination, a driving member having a central aperture adapted to engagingly receive the pump shaft of an engine therein, said driving member having a hub, an antifriction bearing supported in said hub and a carrier member supported by said bearing, said carrier member having a hollow shaft extending into and supported by said bearing, a bearing surface forwardly of said bearing and a disc forwardly of said bearing surface, a driven member having a central aperture and movably supported on said carrier member bearing surface, said driven member having a rearwardly extending flange with friction material mounted therein, said friction material having a conical surface in juxtaposition and engageable with said conical driving surface, opposed wells in the rear face of said disc and the forward surface of said driven member and having compression spring means seated therein and urging said driven member rearwardly, a thermally responsive element carried by the forward part of said disc and having a rearwardly extensible post extending into the hollow shaft of the carrier member, an enlarged opening extending transversely through said hollow shaft and a transversely extending relatively smaller pin in said opening engageable by the post of said thermally responsive element, said pin extending through the bearing surface of said shaft and into recesses in said driven member, means operatively connecting said driven member to said carrier member for joint rotary movement and relative axial movement, and means for connecting a fan to said carrier member.

6. In combination, a driving member having a central aperture adapted to engagingly receive the pump shaft of an engine therein, said driving member having a hub and a forwardly inclined conical driving surface in spaced concentric relation to said hub, a bearing supported in said hub and a carrier member supported by said bearing, said carrier member having a shaft including a hollow portion extending into and supported by said bearing, bearing surface forwardly of said bearing and a disc forwardly of said bearing surface, a driven member having a central aperture and movably supported on said carrier member bearing surface, said driven member having a rearwardly extending flange with friction material mounted therein, said friction material having a conical surface in juxtaposition and engageable with said conical driving surface, spring means between the rear face of said disc and the forward surface of said driven member and urging said driven member rearwardly, a thermally responsive element carried by the forward part of said carrier member and having a rearwardly extensible post extending into the hollow portion in the shaft of the carrier member, an enlarged opening extending transversely through said hollow and a transversely extending relatively smaller pin in said opening engageable by the post of said thermally responsive element, said pin extending through the bearing surface of said shaft and into recesses in said driven member, means operatively connecting said driven member to said carrier member for joint rotary movement and relative axial movement, and means for connecting a fan to said carrier member.

7. In combination, a driving member having a central aperture adapted to engagingly receive the pump shaft of an engine therein, said driving member having a hub and a forwardly inclined conical driving surface in spaced concentric relation to said hub, a bearing supported in said hub and a carrier member supported by said bearing, said carrier member having a shaft extending into and supported by said bearing, a bearing surface forwardly of said bearing and a disc forwardly of said bearing surface, a driven member having a central aperture and movably supported on said carrier member bearing surface, said driven member having a rearwardly extending flange with friction material mounted therein, said friction material having a conical surface in juxtaposition and engageable with said conical driving surface, spring means between the rear face of said disc and the forward surface of said driven member and urging said driven member rearwardly, a thermally responsive element carried by the forward part of said disc and having a rearwardly extensible post, means to transmit a rearward force generated by the movement of said post when said element is heated to said driven member to urge the same rearwardly, means operatively connecting said driven member to said carrier member for joint rotary movement and relative axial movement, and means for connecting a fan to said carrier member.

8. In combination, a driving member having a central aperture adapted to engagingly receive the pump shaft of an engine therein, said driving member having a hub and a forwardly inclined conical driving surface in spaced concentric relation to said hub, a carrier member rotatably supported in said hub, said carrier member having a shaft extending into and supported by said hub, a bearing surface forwardly of said hub and a disc forwardly of said bearing surface, a driven member having a central aperture and movably supported on said carrier member bearing surface, said driven member having a rearwardly extending flange with friction material mounted therein, said friction material having a conical surface in juxtaposition and engageable with said conical driving surface, spring means between the rear face of said disc and the forward surface of said driven member and urging said driven member rearwardly, a thermally responsive element carried by the forward part of said disc and having a rearwardly extensible post, means to transmit a rearward force generated by the movement of said post when said element is heated to said driven member to urge the same rearwardly, means operatively connecting said driven member to said carrier member for joint rotary movement and relative axial movement, and means on said driving and driven members permitting heat-dissipating air to flow therethrough, and means for connecting a fan to said carrier member.

9. In combination, a driving member having a central aperture adapted to engagingly receive the pump shaft of an engine therein, said driving member having a hub and a forwardly inclined conical driving surface in spaced concentric relation to said hub, a carrier member rotatably supported by said hub, said carrier member having a shaft extending into and supported by said hub and a disc forwardly of said hub, a driven member, means movably supporting said driven member on said carrier member, said driven member having a flange, said flange carrying friction material having a conical surface engageable with said conical driving surface, spring means between the rear face of said disc and the forward surface of said driven member and urging said driven member rearwardly, a thermally responsive element carried by the forward part of said disc and having a rearwardly extensible post, means to transmit a rearward force generated by the movement of said post when said element is heated to said driven member to urge the same rearwardly, means operatively connecting said driven member to said carrier member for joint rotary movement and relative axial movement, means on said driving and driven members permitting heat-dissipating air to flow therethrough, and means for connecting a fan to said carrier member.

10. In combination, a driving member having a central aperture adapted to engagingly receive the pump shaft of an engine therein, said driving member having a hub and a forwardly inclined conical driving surface in spaced concentric relation to said hub, a carrier member rotatably supported by said hub, said carrier member having a shaft extending into and supported by said hub and a disc forwardly of said hub, a driven member, means movably supporting said driven member on said carrier member, said driven member having a flange, said flange carrying friction material having a conical surface engageable with said conical driving surface, spring means between the rear face of said disc and the forward surface of said driven member and urging said driven member rearwardly, a thermally responsive element carried by the forward part of said disc and having a part extensible upon an increase in temperature of said element, means to transmit the force generated by said part to said driven member to urge the same rearwardly to thereby increase the force of engagement of said clutch surfaces, means operatively connecting said driven member to said carrier member for joint rotary movement and relative axial movement, means on said driving and driven members permitting heat-dissipating air to flow therethrough, and means for connecting a fan to said carrier member.

References Cited in the file of this patent
UNITED STATES PATENTS

| | | |
|---|---|---|
| 2,438,161 | Greenlee | Mar. 23, 1948 |
| 2,840,315 | Heiss | June 24, 1958 |
| 2,840,316 | Herbenar | June 24, 1958 |